United States Patent [19]

Paul

[11] 4,419,168

[45] * Dec. 6, 1983

[54] APPARATUS FOR HANDLING GASKET-FORMING MATERIAL

[76] Inventor: William A. Paul, 2338 Townley Rd., Toledo, Ohio 43614

[*] Notice: The portion of the term of this patent subsequent to Jun. 16, 1998 has been disclaimed.

[21] Appl. No.: 310,806

[22] Filed: Oct. 13, 1981

Related U.S. Application Data

[62] Division of Ser. No. 107,548, Dec. 27, 1979, Pat. No. 4,334,636.

[51] Int. Cl.³ ............................................. B32B 31/00
[52] U.S. Cl. ............................... 156/351; 100/215; 118/213; 118/243; 118/263; 118/703; 156/356; 156/366; 156/384; 156/390; 156/540; 156/566; 156/578; 156/580; 413/9; 413/19; 413/21; 413/57; 413/60; 425/110
[58] Field of Search ............... 156/230, 390, 351, 540, 156/356, 566, 366, 578, 384, 580; 100/215; 118/213, 263, 243, 703; 264/259; 425/110; 413/9, 57, 19, 60, 21

[56] References Cited

U.S. PATENT DOCUMENTS

| | | | |
|---|---|---|---|
| 624,835 | 5/1899 | Malchow et al. | 264/259 |
| 1,145,412 | 7/1915 | Furber | 118/263 |
| 2,264,628 | 12/1941 | Engert et al. | 156/291 |
| 3,232,815 | 2/1966 | Klopfenstein et al. | 156/566 |
| 3,715,258 | 2/1973 | Cunnane | 156/356 |
| 4,102,304 | 7/1978 | Sebenham | 413/19 |
| 4,273,607 | 6/1981 | Paul | 156/540 |
| 4,352,712 | 10/1982 | Paul | 156/540 |

Primary Examiner—John J. Gallagher
Attorney, Agent, or Firm—Allen D. Gutchess, Jr.

[57] ABSTRACT

Apparatus is provided for handling gasket-forming material. This material is usually supplied in tubular cartridge form and is dispensed to a screen with a porous pattern which shapes the material to the desired gasket-configuration. The material is spread on the screen and forced through to the other side where the gasket pattern is applied to an adjacent transfer surface of a transfer pad. This pad with the pattern on the transfer surface is moved to a mateable surface of a workpiece located on a support spaced from the screen. The gasket-forming material is then transferred to the mateable surface. The gasket-forming material is dispensed from the cartridge with the aid of a cartridge holder having an opening at one end to receive a spout of the cartridge and having a plunger at the other end with a plunger rod extending outwardly therefrom. A fluid-operated cylinder is aligned with the plunger rod and has a piston connected with the rod. Fluid under pressure is supplied to the blind end of the cylinder at predetermined intervals and for predetermined periods of time to move the piston and to advance the plunger in the cartridge a predetermined amount. Both the intervals and the time of operation are adjustably controlled. The fluid supplied to the blind end of the cylinder preferably is air and liquid is located in the rod end of the cylinder with this liquid being expelled into a reservoir as the piston advances in the cylinder. To return the piston and the plunger after the cartridge is emptied, air can be supplied under pressure to the fluid in the reservoir.

7 Claims, 4 Drawing Figures

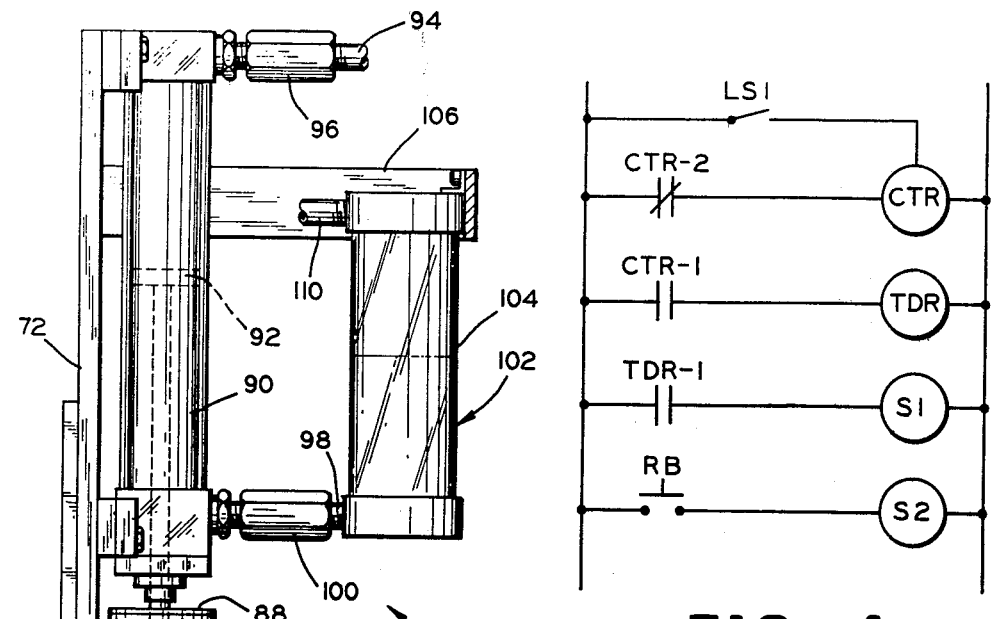
FIG. 2
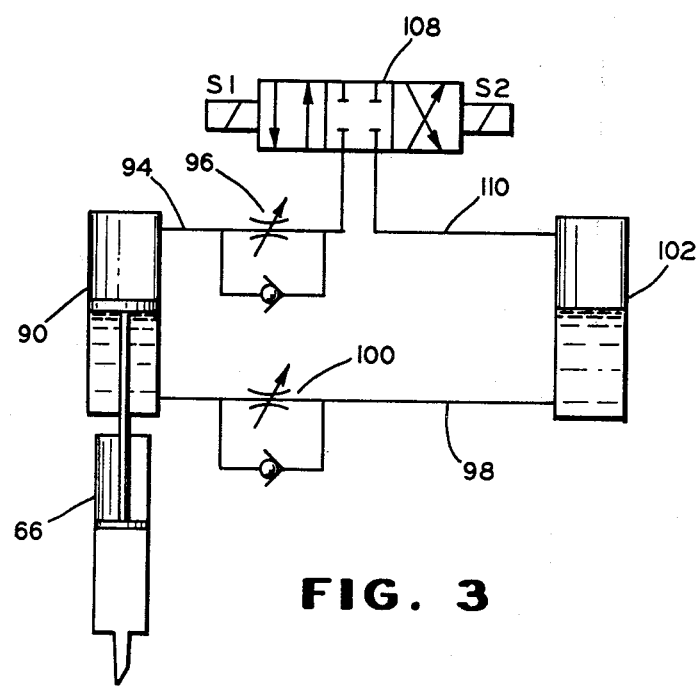
FIG. 4
FIG. 3

APPARATUS FOR HANDLING GASKET-FORMING MATERIAL

This is a division of application Ser. No. 107,548, filed Dec. 27, 1979, now U.S. Pat. No. 4,344,636.

This invention relates to apparatus for handling gasket-forming material.

Gasket-forming material is known in the art for effecting seals between the mateable surfaces of workpieces. This material constitutes a substitute for conventional gaskets and as such has a number of advantages. There is no need to retain a large gasket inventory nor need special gaskets be cut for particular applications. Further, conventional gaskets can shrink or wear out, thereby producing loosening or leakage and they also produce disassembly and removal problems. The gasket-forming material, on the other hand, often provides an improved seal and effectively seals scratched or similarly damaged surfaces. The structural integrity of assembled workpieces also frequently is improved.

The gasket-forming material can be supplied in cartridges. Heretofore, a bead of the material was manually spread from the spout of the cartridge onto the surface of the workpiece which was to be mated with a surface of another workpiece. Also, templates manipulated by hand were used to some extent where a number of workpieces were to have the beads of the gasket-forming material applied. While the templates for applying the gasket-forming material were satisfactory for a few pieces, they were inadequate for gasket-type seals on workpieces from a production standpoint. Further, because of the above-outlined advantages of the gasket-forming material, the desirability of applying the material quickly and accurately in production has accordingly increased.

In my co-pending U.S. patent application Ser. No. 090,466, filed on Nov. 1, 1979, now U.S. Pat. No. 4,273,607, apparatus is disclosed for applying a bead or deposit of gasket-forming material to mateable surfaces of workpieces in a rapid, accurate, and efficient manner. In that apparatus, gasket-forming material is supplied to shaping means which shapes the material to the desired gasket configuration. The shaping means can be in the form of a screen having a porous area in the shape of the gasket. The gasket-forming material is spread on the screen and forced through the porous area to a transfer surface of a transfer member or pad. The transfer pad is then moved from a position with the transfer surface adjacent the screen to a position in which the surface is engagable with a mateable surface of a workpiece to which the gasket-forming material is then applied. The workpiece is carried on a suitable moveable support which carries the workpiece to a station at which the mateable surface is engaged by the transfer pad and then beyond that station, with other workpieces sequentially moved into position.

The present invention provides means for handling the gasket-forming material and dispensing it from a cartridge to the shaping means or screen. The dispensing apparatus includes a cartridge holder having an opening or slot at one end to receive the cartridge spout and a plunger at the other end having a plunger rod extending outwardly therefrom. A fluid-operated cylinder is aligned with the plunger rod and has a piston connected with the rod. In a preferred form, the piston is advanced in the cylinder and the plunger is advanced through the cartridge by air under pressure applied to the blind end of the cylinder. The rod end of the cylinder has liquid therein to control the movement of the piston, with the liquid being expelled from the cylinder to a reservoir as the piston advances.

When the cartridge is empty, air pressure can be applied to the reservoir to force the liquid back into the rod end of the cylinder to return the piston and plunger to the initial positions. The air is supplied to the blind end of the cylinder at predetermined intervals and is applied for a predetermined period of time to control the length of the stroke of the piston and the plunger at each interval.

It is, therefore, a principal object of the invention to provide apparatus for dispensing gasket-forming material to apparatus for applying gaskets to mateable surfaces of workpieces.

Another object of the invention is to provide dispensing apparatus for dispensing gasket-forming material in a precisely controlled manner to shaping means for shaping the material to a desired gasket configuration.

Yet another object of the invention is to provide dispensing means for gasket-forming material which dispenses the material at predetermined intervals and for a predetermined period of time at each interval.

Many other objects and advantages of the invention will be apparent from the following detailed description of a preferred embodiment thereof, reference being made to the accompanying drawings, in which:

FIG. 2 is an enlarged, side view in elevation of the dispensing apparatus of FIG. 1;

FIG. 3 is a flow diagram for the dispensing apparatus of FIG. 2; and

FIG. 4 is a control circuit for the apparatus of FIGS. 2 and 3.

Figure 1:
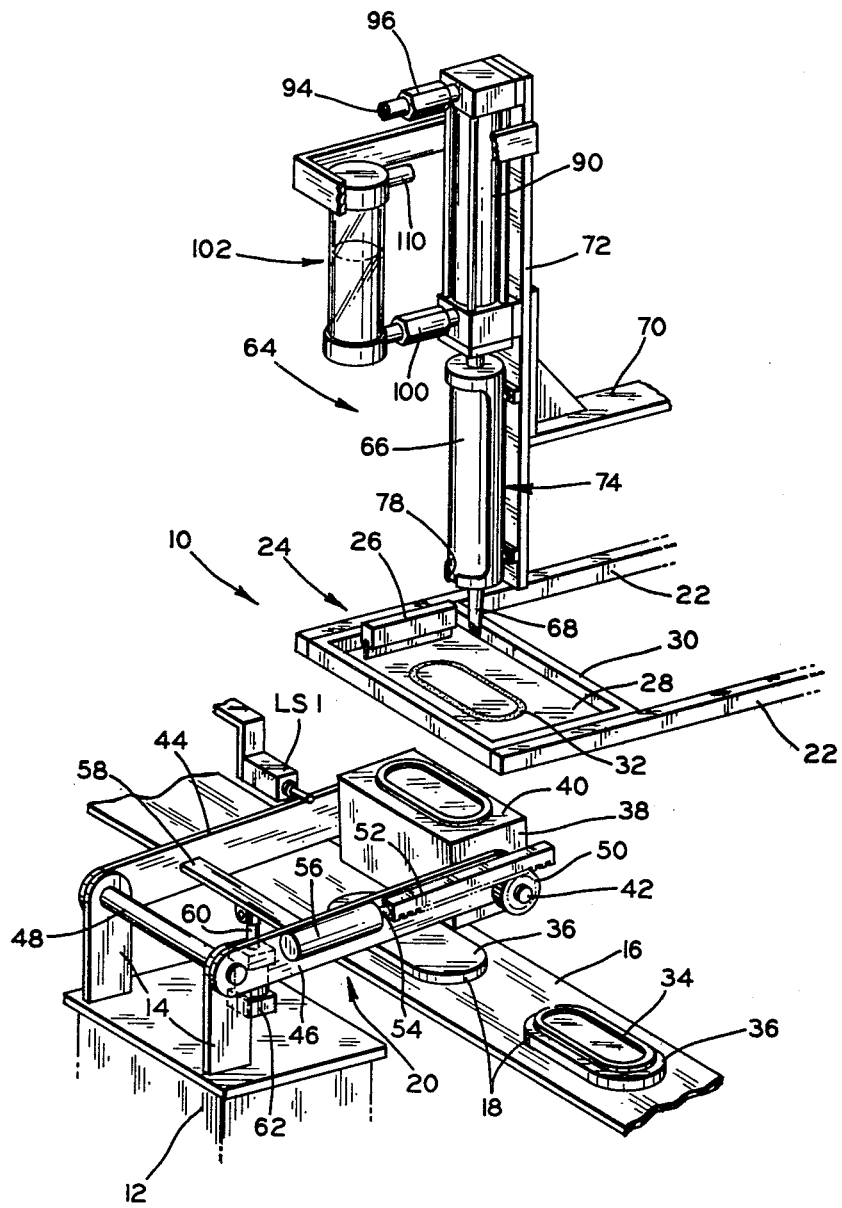
FIG. 1 is a schematic view in perspective of apparatus for forming gaskets on workpieces and dispensing apparatus for dispensing gasket-forming material in accordance with the invention.

Referring to FIG. 1, apparatus for applying deposits or beads of gasket-forming material to mateable surfaces of workpieces is indicated at 10. The apparatus includes a suitable mounting stand 12 with upwardly-extending frame members 14 positioned at one side of a moveable workpiece support in the form of a conveyor 16 which supports workpieces 18 and sequentially carries them to and then beyond a gasket-applying station indicated at 20.

Suitable supporting bars 22 are located above the station 20 and support shaping means indicated at 24 for shaping gasket-forming material into a desired gasket configuration. A movable distributor vane 26 spreads gasket-forming material over a screen 28 located in a frame 30 held by the bars 22. The screen 28 has a porous pattern 32 formed by minute openings, with the pattern being in the size and shape of a bead or deposit 34 of gsket-forming material applied to a mateable surface 36 of the workpiece 18. A commercially-available screen printer can be employed in place of the shaping means 24.

A transfer member or pad 38 has two transfer surfaces 40 which are located in parallel relationship and face in opposite directions. Each of the surfaces 40 can receive the gasket-forming material through the pattern 32 of the screen 28 when in an adjacent position therewith. When the pad is rotated approximately 180°, that material is then transferred to the workpiece 18 to form the gasket thereon. The transfer member 38 is mounted on shafts 42 which are rotatably carried by outer ends of two pivotable frame members 44 and 46, the other ends of the frame members 44 and 46 being rotatably mounted on the frame members 14 by a suitable axle 48. One of the shafts 42 has a pinion gear 50 thereon meshing with a gear rack 52. The rack 52 is affixed to a piston rod 54 extending from a fluid-operated cylinder 56. The transfer member 38 is caused to pivot or rotate through the pinion gear 50 and the rack 52 when the piston rod 54 extends from and retracts into the cylinder 56.

The transfer member 38 is moved between two positions, one adjacent the screen 28 and one adjacent the workpiece 18. This is achieved through a transverse bar 58 which extends between the frame members 44 and 46. A piston rod 60 is connected to a central portion of the bar 58 and extends from a fluid-operated cylinder 62 which moves the framework and the transfer member between the two positions.

In the operation of the apparatus 10, the transfer member 38 is moved through an arc of approximately 180° once during each complete down and up operating cycle. Once during each cycle, the frame member 44 actuates a limit switch LS1 which will be discussed subsequently.

Apparatus for dispensing gasket-forming material to the shaping means 24 is indicated at 64, the material being dispensed from a cartridge 66 having a spout 68. The apparatus includes a suitable supporting frame 70 carrying a vertical mounting plate 72. A cartridge holder 74 is affixed to a lower portion of the mounting plate 72, having a lower end wall 76 with a slot or opening 78 to receive the cartridge spout 68. The holder also has a cylindrical wall 80 with a front opening 82 to receive the cartridge. A plunger 84 in the holder has a plunger rod 86 extending through an upper end wall 88 with the length of the plunger rod exceeding the length of the cartridge 66. The plunger rod 86 extends into a fluid-operated cylinder 90 which is affixed to an upper portion of the mounting plate 72 in alignment with the holder 74. A piston 92 in the cylinder 90 is connected with the upper end of the plunger rod 86.

In the operation of the dispensing apparatus 64, fluid, preferably air, is supplied to the blind end of the cylinder 90 through a line 94 and a unidirectional flow control valve 96, which is commercially available. Fluid, preferably liquid, is in the rod end of the cylinder 90. When air pressure is applied to the blind end of the cylinder, the liquid is expelled through a line 98 and a unidirectional flow control valve 100 to a reservoir 102. The reservoir, which preferably has a transparent cylindrical wall 104, is supported by a suitable bracket 106 foom the mounting plate 72.

The air is controlled by a four-way valve 108, which is also commercially available. In the position shown, no air is supplied to the system and the plunger 84 and the piston 92 are stationary. When a solenoid S1 at one end of the valve 108 is actauted, the valve core is moved to the right and air pressure is applied to the blind end of the cylinder 90 through the line 94 and the valve 96. The piston 92 then moves downwardly at a rate determined by the flow of the liquid through the line 98 and the valve 100 to the reservoir 102. The length of movement of the piston 92 and the plunger 84 depends upon how long the solenoid S1 is energized. When the solenoid is de-energized, the valve 108 returns to the position of FIG. 3 with the piston and the plunger being stationary once again.

When the piston 92 and the plunger 84 have reached the end of their stroke, a valve solenoid S2 is energized and the core of the valve 108 then moves to the left. Air is then applied under pressure through a line 110 to the top of the reservoir 102. The liquid is then forced back into the rod end of the cylinder 92 and the plunger and the piston return to their initial positions at a rate determined by the flow of air out of the blind end of the cylinder through the flow control valve 96.

The air is supplied to the blind end of the cylinder 90 at predetermined intervals which can be multiples of the length of the operating cycle of the apparatus 10. Depending upon the particular application, for example, the interval at which air is supplied to the cylinder and the piston and plunger move downwardly can be anywhere from one to ten complete down and up operating cycles of the transfer member 38. As the limit switch LS1 is actuated once during each cycle, it supplies a pulse to a counter designated CTR in FIG. 4. At the end of a predetermined number of pulses, the counter closes its contact CTR-1 and opens its contact CTR-2. The latter resets the counter for the next interval and the former actuates a time delay relay TDR. This relay then begins timing out for a predetermined period of time which can be manually adjusted. During this period, contacts TDR-1 close to actuate the solenoid S1. The core of the valve 108 then moves to the right and air is supplied to the blind end of the cylinder 90 with the liquid in the rod end of the cylinder moving into the reservoir 102 at a rate determined by the flow control valve 100. The length of the time set by the time delay relay TDR also determines the length of the stroke of the plunger 84 during each of the intervals, which is determined by the counter CTR.

Each time the plunger 84 moves downwardly, more liquid is expelled from the blind end of the cylinder 90 into the reservoir 102. A line can be scored on the transparent cylinder wall 104 to indicate to an operator when the plunger 84 is substantially at the lower extremity of its stroke and the cartridge needs to be replaced.

When the plunger reaches the end of the stroke, it can be returned to its upper extremity by the operator who simply pushes a return button RB to actuate the solenoid S2. The core of the valve 108 then moves to the left to supply the air to the top of the reservoir 102 and force the liquid back into the rod end of the cylinder 90. The piston 92 then moves upwardly at a rate controlled by the flow of the air from the blind end of the cylinder through the flow control valve 96.

The deposit or bead of the gasket-forming material forming a gasket 34 on the workpiece 18 can be quite thin, being in the order of 0.007 inch thick, by way of example. Consequently, each gasket can be formed with a relatively small volume of the material from the cartridge 66. In many instances, only two or three cartridges are needed for a full day's production. Consequently, the cartridges do not have to be replaced in the holder 74 very often.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. Apparatus for shaping gasket-forming material to a gasket configuration and applying the shaped material to a workpiece, said apparatus comprising shaping means for shaping the gasket-forming material to a desired gasket configuration, and transfer means for transferring the shaped material in operating cycles from said shaping means to a workpiece and returning to said shaping means, means for supplying the gasket-forming material to said shaping means comprising a cartridge of gasket-forming material, a cartridge holder having an opering to receive the cartridge, a plunger at an upper end of said cartridge holder and having a plunger rod extending outwardly therefrom, drive means for engaging said plunger rod to move said plunger toward a lower end of said cartridge holder, means for operating said drive means at predetermined intervals which are multiples of the operating cycles of said transfer means, and means for controlling the length of operation of said drive means at each interval.

2. Apparatus according to claim 1 characterized by each of said intervals occurring at the end of a predetermined number of pulses equaling at least one pulse, and said operating means establishing a pulse each time said transfer means operating cycle moving from one shaping means to the workpiece and returning again to said shaping means.

3. Apparatus according to claim 2 characterized by said controlling means comprising an adjustable time delay relay actuated by said operating means.

4. Apparatus according to claim 1 characterized by said drive means comprising a fluid-operated cylinder, a piston in said cylinder connected with said plunger rod, and means for supplying fluid to said cylinder.

5. Apparatus according to claim 4 characterized by said fluid supply means comprising means for supplying air to the blind end of said cylinder.

6. Apparatus according to claim 4 characterized by there being liquid in the rod end of said cylinder, and a reservoir for receiving liquid when said piston moves toward the rod end of said cylinder.

7. Apparatus according to claim 6 characterized by there being a flow control valve located between the rod end of said cylinder and said reservoir for controlling the rate of flow of liquid from said cylinder to said reservoir.

* * * * *